US010633960B2

(12) United States Patent
Graney, IV et al.

(10) Patent No.: US 10,633,960 B2
(45) Date of Patent: Apr. 28, 2020

(54) NATURAL GAS APPARATUS AND METHOD FOR IN-SITU PROCESSING

(71) Applicant: Nacelle Logistics LLC, Charleston, WV (US)

(72) Inventors: Patrick C. Graney, IV, Charleston, WV (US); Gouverneur C. M. Graney, Charleston, WV (US)

( * ) Notice: Subject to any disclaimer, the term of this patent is extended or adjusted under 35 U.S.C. 154(b) by 165 days.

(21) Appl. No.: 15/990,602

(22) Filed: May 26, 2018

(65) Prior Publication Data

US 2018/0274350 A1 Sep. 27, 2018

Related U.S. Application Data

(62) Division of application No. 15/062,955, filed on Mar. 7, 2016.

(51) Int. Cl.
*E21B 43/34* (2006.01)
*C10L 3/10* (2006.01)
(Continued)

(52) U.S. Cl.
CPC .......... *E21B 43/34* (2013.01); *B01D 46/0027* (2013.01); *B01D 46/4263* (2013.01); *B01D 46/448* (2013.01); *B01D 53/229* (2013.01); *C10L 3/101* (2013.01); *B01D 53/22* (2013.01); *B01D 2053/221* (2013.01);
(Continued)

(58) Field of Classification Search
CPC ................. B01D 53/229; B01D 53/22; B01D 2053/221; B01D 46/0027; Y02C 10/10; C10L 3/101; C10L 2290/547; C10L 2290/548; C10L 2290/567; E21B 43/34; E21B 43/00; C01B 2203/0405
See application file for complete search history.

(56) References Cited

U.S. PATENT DOCUMENTS 8,100,076 B1 * 1/2012 Shivers, III ............. B63B 27/24
114/230.14
2005/0115248 A1 * 6/2005 Koehler ................... F17C 1/002
62/53.1
(Continued)

FOREIGN PATENT DOCUMENTS

DE 10338563 A1 * 3/2005 ........... B01D 53/229

*Primary Examiner* — Imran Akram
(74) *Attorney, Agent, or Firm* — Andrew W. Ludy

(57) ABSTRACT

A natural gas processing system is mounted on at least one mobile platform that is transported to a natural gas source, such as a well. A liquid removal tank separates liquid contaminants from the gas. A particulate filter removes particulates from the gas. A membrane separates the natural gas into a retentate gas and a permeate gas. A gas compressor is selectively connected either upstream of the membrane or downstream of the membrane. For low pressure source gas, the upstream connection will compress the natural gas before entering the membrane. For high pressure source gas, the downstream connection will compress the natural gas after exiting the membrane. An electrical generator and an air compressor are provided. A process control is connected to all the valves in the system, all instruments, the gas compressor, the electrical generator, and the air compressor. The process control monitors and controls the natural gas processing system.

34 Claims, 9 Drawing Sheets

(51) Int. Cl.
*B01D 46/42* (2006.01)
*B01D 46/44* (2006.01)
*B01D 53/22* (2006.01)
*B01D 46/00* (2006.01)

(52) U.S. Cl.
CPC .. *B01D 2257/304* (2013.01); *B01D 2257/504* (2013.01); *C10L 2290/06* (2013.01); *C10L 2290/46* (2013.01); *C10L 2290/547* (2013.01); *C10L 2290/548* (2013.01); *C10L 2290/567* (2013.01); *C10L 2290/58* (2013.01)

(56) References Cited

U.S. PATENT DOCUMENTS

| | | | |
|---|---|---|---|
| 2007/0125537 A1* | 6/2007 | Lokhandwala | B01D 53/22 166/291 |
| 2007/0272079 A1* | 11/2007 | Malsam | B01D 53/226 95/51 |
| 2008/0127673 A1* | 6/2008 | Bowen | F17C 5/00 62/611 |
| 2009/0193884 A1* | 8/2009 | Moore | E21B 49/008 73/152.23 |
| 2010/0186586 A1* | 7/2010 | Chinn | B01D 53/22 95/45 |
| 2012/0000359 A1* | 1/2012 | Bresler | B01D 53/75 95/51 |
| 2013/0019633 A1* | 1/2013 | Pierce | B01D 53/002 62/618 |
| 2013/0263624 A1* | 10/2013 | Vandor | F25J 1/0022 62/611 |

* cited by examiner

HIGH PRESSURE SOURCE GAS

LOW PRESSURE SOURCE GAS

LOW PRESSURE SOURCE GAS

US 10,633,960 B2

NATURAL GAS APPARATUS AND METHOD FOR IN-SITU PROCESSING

INCORPORATION BY REFERENCE

This application is a divisional of U.S. patent application Ser. No. 15/062,955, filed on Mar. 7, 2016, and entitled, "Natural Gas Apparatus And Method For In-Situ Processing," and incorporated in its entirety for the teachings therein. Benefit of the priority filing date of Mar. 7, 2016 is hereby claimed.

TECHNICAL FIELD

The presently disclosed technologies are directed to a method and apparatus that processes natural gas, and in particular, to a method and a transportable apparatus for processing natural gas at the wellhead.

BACKGROUND

It is often uneconomical or impractical to capture and transport natural gas in a special pipeline from the wellhead to a refinery. In these cases the gas is flared off, or burned. It is thus wasted, both as a source of energy and as a valuable commodity.

In those instances where a pipeline is built, other problems develop. Natural gas at the wellhead usually contains impurities such as carbon dioxide ($CO_2$), and hydrogen sulfide ($H_2S$). When dissolved in water, $CO_2$ is known as carbonic acid. Similarly, $H_2$ becomes hydrosulfuric acid. Either of these acids will cause corrosion problems in pipelines and related equipment during transportation of natural gas.

The natural gas product at retail comprises almost pure methane, but raw natural gas from the wellhead contains a variety of contaminants. In addition to the $CO_2$ and $H_2S$, other gases such as nitrogen and carbon dioxide may be found in oil and gas wells. Solid impurities include sand and dirt from the reservoir; and scale and corrosion products from the piping. The wells produce a mixture of hydrocarbon gas, condensate, or oil; and water with dissolved minerals such as salt. The oil and gas is processed to separate these components.

Natural gas condensate is a mixture of hydrocarbon liquids that are gaseous components of the natural gas produced by natural gas fields. It condenses from the raw gas if the temperature drops below the dew point. The condensate gas includes mostly ethane, propane, butane and pentanes. These components are separated and sold.

Membranes are often used to separate raw gas into components. Each component permeates through the membrane at a different rate. The components such as $CO_2$ and $H_2S$ and water will permeate faster through the membrane than components such as $N_2$ and methane. Thus, the feed stream is separated into retentate, which is mostly methane-rich natural gas and is depleted of heavy hydrocarbons; and permeate, which includes $CO_2$, $H_2S$, water, and heavier hydrocarbons described above as condensate gas.

Membranes are typically non-porous polymeric films. The most commonly used polymers for this purpose are polycarbonate, polysulfone, polyimide, and cellulose acetate. Membranes are produced in various configurations, such as flat sheets, spiral wound sheets, or hollow fibers. Hollow fibers are preferred due to having the highest packing density, meaning greatest membrane area per unit volume.

Some limited processing of raw natural gas is often carried out at the well site. However, the complete processing of natural gas is typically carried out at a centralized process plant, or refinery. Gas from the wellhead is transported by pipeline or tanker vehicle to the refinery.

There are benefits for oil and gas companies to utilize natural gas on site to power engines, rather than trucking in diesel fuel or gasoline. Such engines, for example, would power drilling rigs or pump trucks during fracking. Using refined products, such as LNG or CNG, requires offsite processing, trucking and specialized equipment to deliver the fuel to the site. On site natural gas is source or field gas from a well or pipeline. The benefits include cost savings, employee safety, and less environmental disturbance.

Natural gas engines maintain the best performance and require the least maintenance when utilizing a dry, consistent BTU gas delivered at an optimal pressure and temperature. Various engine manufacturers spec different ideal BTU ranges but typically 1000 to 1100 BTU is the prime range that balances horsepower required to do the job with engine and exhaust heat that causes engine and maintenance issues. It is not economical to develop a pipeline infrastructure to a well pad for pre-processed gas to power engines.

Accordingly, there is a need to provide a method and accompanying apparatus for natural gas processing that is transportable to the wellhead site, and that is self-contained, and is capable of processing of raw natural gas of varying quality found at the gas source.

There is a further need to provide a method of the type described, and that can selectively process either low pressure or high pressure source gas.

There is a still further need to provide a method of the type described, and that is capable of being powered by fuels recovered at the wellhead.

SUMMARY

In one aspect, a method is disclosed for natural gas processing. The method is used in connection with a natural gas source and raw source natural gas produced by the source. The method comprises providing at least one mobile platform, and adapting the mobile platform for being transported to the natural gas source.

The mobile platform is transported to the natural gas source. A liquid removal tank is juxtaposed with the mobile platform, and the liquid removal tank is connected in fluid communication to the natural gas source. The source natural gas is then received into the liquid removal tank. Liquid contaminants are separated from the source natural gas with the liquid removal tank. Meanwhile, the natural gas is allowed to pass through the liquid removal tank.

A source natural gas valve is connected in fluid communication with the natural gas source and the liquid removal tank. The source natural gas entering the natural gas processing is controlled with the source natural gas valve.

A particulate filter is juxtaposed with the mobile platform. The particulate filter is connected in fluid communication with the liquid removal tank. Particulate matter from the natural gas is removed with the particulate filter. The natural gas is allowed to pass through the particulate filter.

A membrane is juxtaposed with the mobile platform. The membrane is connected in fluid communication with the natural gas source. The natural gas is separated into a retentate gas and a permeate gas with the membrane. The permeate gas is allowed to pass through the membrane, while passage of the retentate gas through the membrane is restricted. A retentate valve is connected in fluid communication with the membrane. The retentate gas exiting the natural gas processing is controlled with the retentate valve.

A gas compressor is juxtaposed with the mobile platform. The gas compressor is connected in fluid communication with the membrane. The natural gas is compressed with the gas compressor. The natural gas is allowed to pass through the gas compressor. The gas compressor is powered by a first power source.

An air compressor is juxtaposed with the mobile platform. Process compressed air is supplied with the air compressor. The air compressor is powered by a second power source.

An electrical generator is juxtaposed with the mobile platform. Process electricity is supplied with the electrical generator. The electrical generator is powered by a third power source.

A process control is operatively connected to at least the gas compressor, the electrical generator, and the air compressor. The natural gas processing is controlled with the process control.

In another aspect, a method is disclosed for natural gas processing. The method is used in connection with a natural gas source and raw source natural gas produced by the source. The method comprises providing at least one mobile platform, and adapting the mobile platform for being transported to the natural gas source.

The mobile platform is transported to the natural gas source. A liquid removal tank is juxtaposed with the mobile platform, and the liquid removal tank is connected in fluid communication to the natural gas source. The source natural gas is then received into the liquid removal tank. Liquid contaminants are separated from the source natural gas with the liquid removal tank. Meanwhile, the natural gas is allowed to pass through the liquid removal tank.

A source natural gas valve is connected in fluid communication with the natural gas source and the liquid removal tank. The source natural gas entering the natural gas processing is controlled with the source natural gas valve.

A particulate filter is mounted on the mobile platform. The particulate filter is connected in fluid communication with the liquid removal tank. Particulate matter from the natural gas is removed with the particulate filter. The natural gas is allowed to pass through the particulate filter.

A membrane is mounted on the mobile platform. The membrane is connected in fluid communication with the natural gas source. The natural gas is separated into a retentate gas and a permeate gas with the membrane. The permeate gas is allowed to pass through the membrane, while passage of the retentate gas through the membrane is restricted. A retentate valve is connected in fluid communication with the membrane. The retentate gas exiting the natural gas processing is controlled with the retentate valve.

A gas compressor is mounted on the mobile platform. The natural gas is compressed with the gas compressor. The natural gas is allowed to pass through the gas compressor. The gas compressor is powered by a first power source.

The gas compressor is selectively connected either upstream of the membrane or downstream of the membrane. Thus, the gas compressor is selectively connected in fluid communication with the membrane in one of two ways:

The gas compressor is connected upstream of the membrane so as to compress the natural gas before entering the membrane. This configuration is selected when the pressure of the source natural gas entering the natural gas processing is found to be less than a predetermined pressure which will be defined hereinbelow.

Alternatively, the gas compressor is connected downstream of the membrane so as to compress the natural gas after exiting the membrane. This configuration is selected when the pressure of the source natural gas entering the natural gas processing is found to be greater than the predetermined pressure.

An air compressor is juxtaposed with the mobile platform. Process compressed air is supplied with the air compressor. The air compressor is powered by a second power source.

An electrical generator is juxtaposed with the mobile platform. The generator supplies process electricity. The electrical generator is powered by a third power source.

A process control is operatively connected to at least the source natural gas valve, the retentate valve, the gas compressor, the electrical generator, and the air compressor. The natural gas processing is controlled with the process control.

In still another aspect, a method is disclosed for natural gas processing. The method is used in connection with a natural gas source and raw source natural gas produced by the source. The method comprises providing at least one mobile platform, and adapting the mobile platform for being transported to the natural gas source.

The mobile platform is transported to the natural gas source. A liquid removal tank is juxtaposed with the mobile platform, and the liquid removal tank is connected in fluid communication to the natural gas source. The source natural gas is then received into the liquid removal tank. Liquid contaminants are separated from the source natural gas with the liquid removal tank. Meanwhile, the natural gas is allowed to pass through the liquid removal tank.

A source natural gas valve is connected in fluid communication with the natural gas source and the liquid removal tank. The source natural gas entering the natural gas processing is controlled with the source natural gas valve.

A particulate filter is mounted on the mobile platform. The particulate filter is connected in fluid communication with the liquid removal tank. Particulate matter from the natural gas is removed with the particulate filter. The natural gas is allowed to pass through the particulate filter.

A membrane is mounted on the mobile platform. The membrane is connected in fluid communication with the natural gas source. The natural gas is separated into a retentate gas and a permeate gas with the membrane. The permeate gas is allowed to pass through the membrane, while passage of the retentate gas through the membrane is restricted. A retentate valve is connected in fluid communication with the membrane. The retentate gas exiting the natural gas processing is controlled with the retentate valve.

A gas compressor is mounted on the mobile platform. The natural gas is compressed with the gas compressor. The natural gas is allowed to pass through the gas compressor. The gas compressor is selectively connected either upstream of the membrane or downstream of the membrane. Thus, the gas compressor is selectively connected in fluid communication with the membrane in one of two ways:

The gas compressor is connected upstream of the membrane so as to compress the natural gas before entering the membrane. This configuration is selected when the pressure of the source natural gas entering the natural gas processing is found to be less than a predetermined pressure which will be defined hereinbelow.

Alternatively, the gas compressor is connected downstream of the membrane so as to compress the natural gas after exiting the membrane. This configuration is selected when the pressure of the source natural gas entering the natural gas processing is found to be greater than the predetermined pressure.

A process control is provided for controlling the natural gas processing.

A first heat exchanger is mounted on the mobile platform. The first heat exchanger is connected upstream of the membrane, and in fluid communication with the membrane. A temperature of the natural gas entering the membrane is changed with the first heat exchanger.

A first temperature control valve is connected upstream of the membrane, and in fluid communication with the membrane and the first heat exchanger. The first temperature control valve is operatively connected to the process control for controlling the temperature of the natural gas entering the membrane.

The flow of the natural gas is divided proportionately between the first heat exchanger and the membrane in proportion to the temperature of the natural gas entering the first temperature control valve. The temperature of the natural gas entering the membrane is thus controlled by proportionately dividing the flow of the natural gas with the first temperature control valve.

A second heat exchanger is mounted on the mobile platform. The second heat exchanger is connected downstream of the membrane, and in fluid communication with the membrane. A temperature of the natural gas downstream of the membrane is changed with the second heat exchanger.

A second temperature control valve is connected downstream of the membrane, and in fluid communication with the membrane and the second heat exchanger. The second temperature control valve is operatively connected to the process control for controlling the temperature of the natural gas downstream of the membrane.

The flow of the natural gas is divided proportionately between the second heat exchanger and the retentate valve in proportion to the temperature of the natural gas entering the second temperature control valve. The temperature of the natural gas downstream of the membrane is thus controlled by proportionately dividing the flow of the natural gas with the second temperature control valve.

An air compressor is mounted on the mobile platform. Process compressed air is supplied with the air compressor.

An electrical generator is mounted on the mobile platform. Process electricity is supplied with the electrical generator.

The process control is connected operatively to at least the source natural gas valve, the retentate valve, the gas compressor, the electrical generator, and the air compressor.

These and other aspects, objectives, features, and advantages of the disclosed technologies will become apparent from the following detailed description of illustrative embodiments thereof, which is to be read in connection with the accompanying drawings.

It should be noted that the drawings herein are not to scale

DETAILED DESCRIPTION

Describing now in further detail these exemplary embodiments with reference to the Figures as described above, the natural gas processing system is typically used to process natural gas sourced from a well or a pipeline. However, the source is non-limiting, and can be a truck tanker, a marine tanker, a stationary storage tank, or any source.

As used herein, a "processing assembly" or "apparatus" refers to one or more devices used to condition or transform or process natural gas into another form or product.

As used herein, "natural gas" refers to raw source natural gas, or refined natural gas, or a gaseous fuel product in any stage of processing from the source to the finished product ready to ship.

As used herein, "process" or "natural gas processing" or "method" refers to a procedure of moving or transporting a raw source natural gas, or a refined natural gas, or a gaseous fuel product, and converting the natural gas into a gaseous fuel product in any stage of processing. The "flow path" is the conduit through which the natural gas moves during the process. The natural gas moves in a "process direction" along the flow path, shown by arrows 80.

As used herein, "method and apparatus" or "system" refers to the process and the equipment for carrying out the process, as described herein.

As used herein, a "membrane" is a film material that serves as a permeoselective barrier or interface between two or more natural gas phases. Separation happens due to one or more of the natural gas components in the raw source natural gas passing through the membrane more easily and quickly than the remaining components.

As used herein, "retentate" gas is a refined natural gas product comprised mostly of methane, and does not pass easily through the membrane. As used herein, "permeate" is the gas that has permeated or passed through the membrane, which includes contaminants, as well as gaseous fuel products which are marketed.

Figure 2:
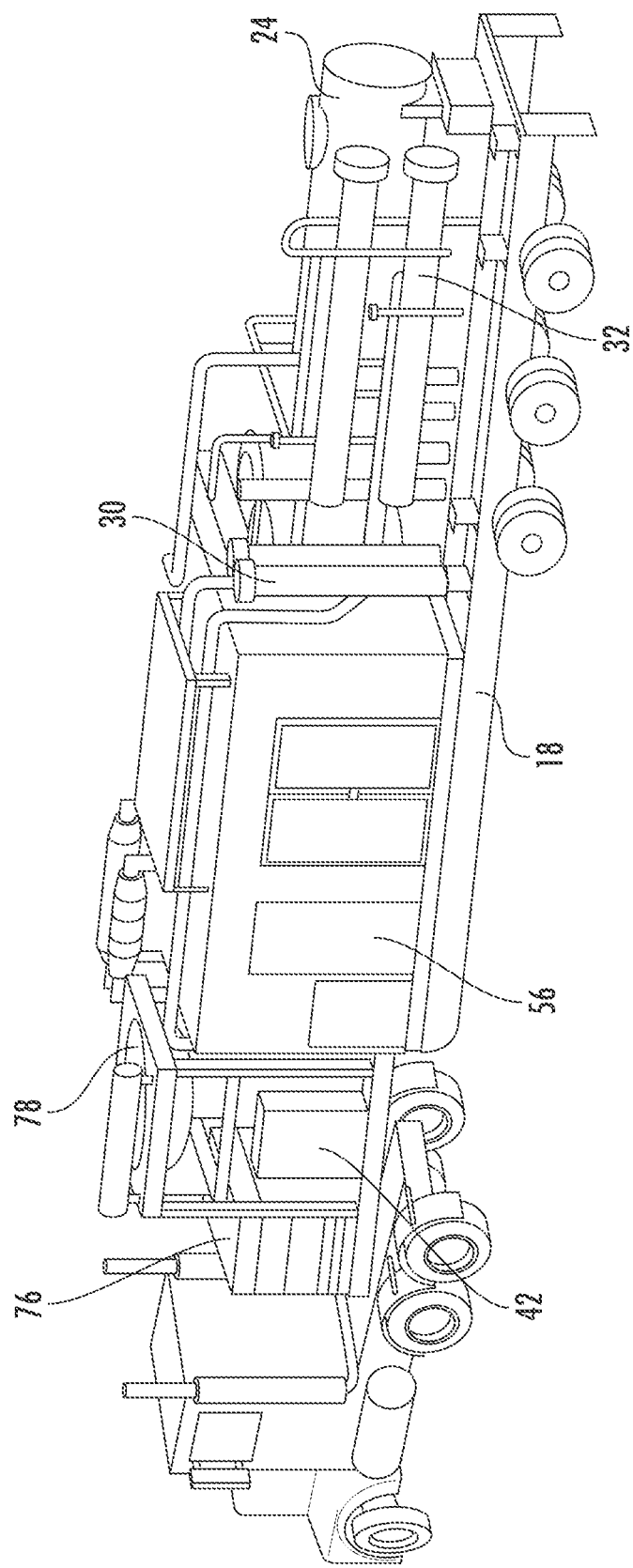
FIG. 2 is a left side perspective view of the natural gas processing method and apparatus of FIG. 1.
Figure 3:
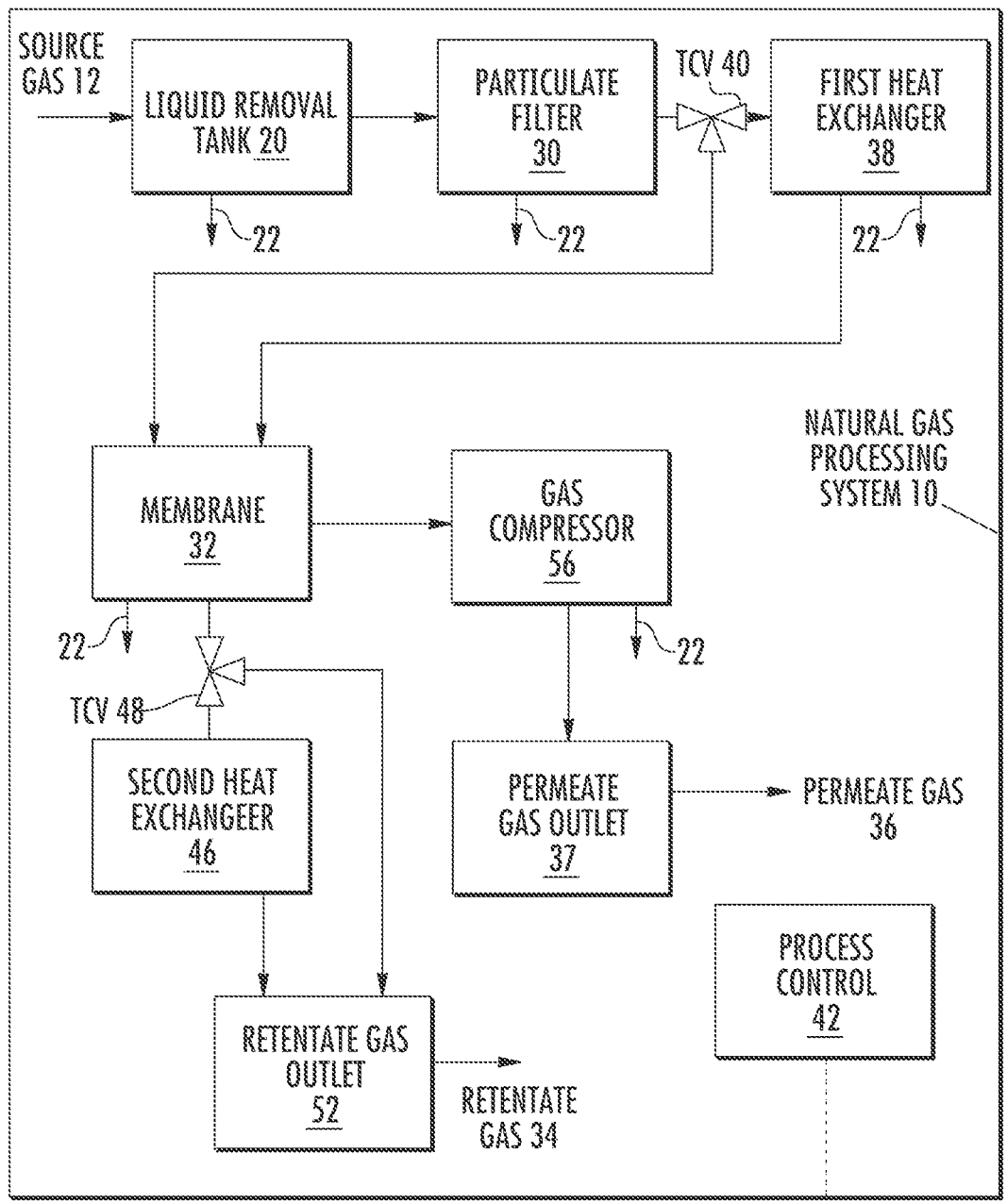
FIG. 3 is a flow diagram of the natural gas processing method and apparatus of FIG. 1.
Figure 4:
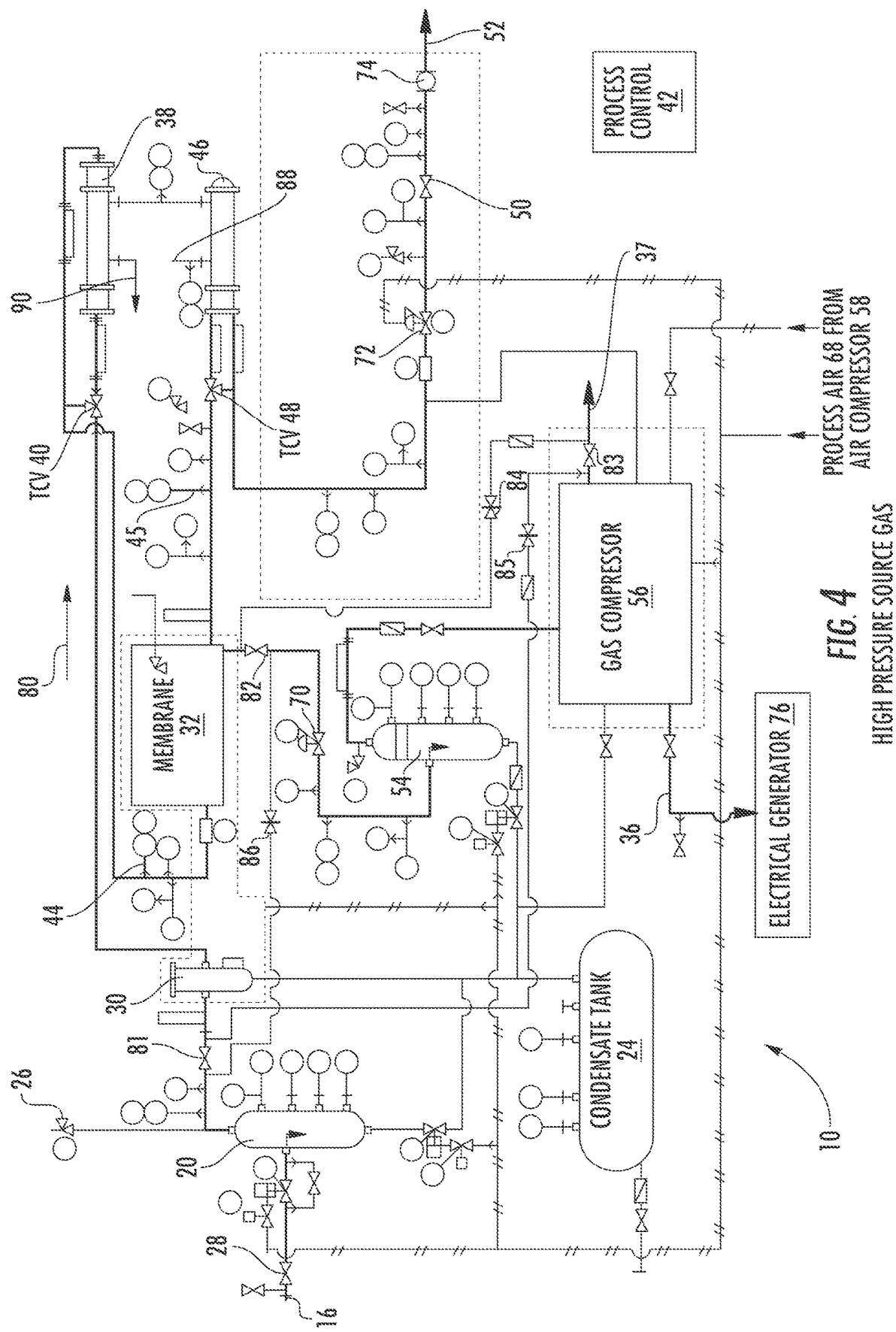
FIG. 4 is a piping and instrumentation diagram of the natural gas processing method and apparatus of FIG. 1, and configured for use with high pressure source natural gas.
Figure 5:
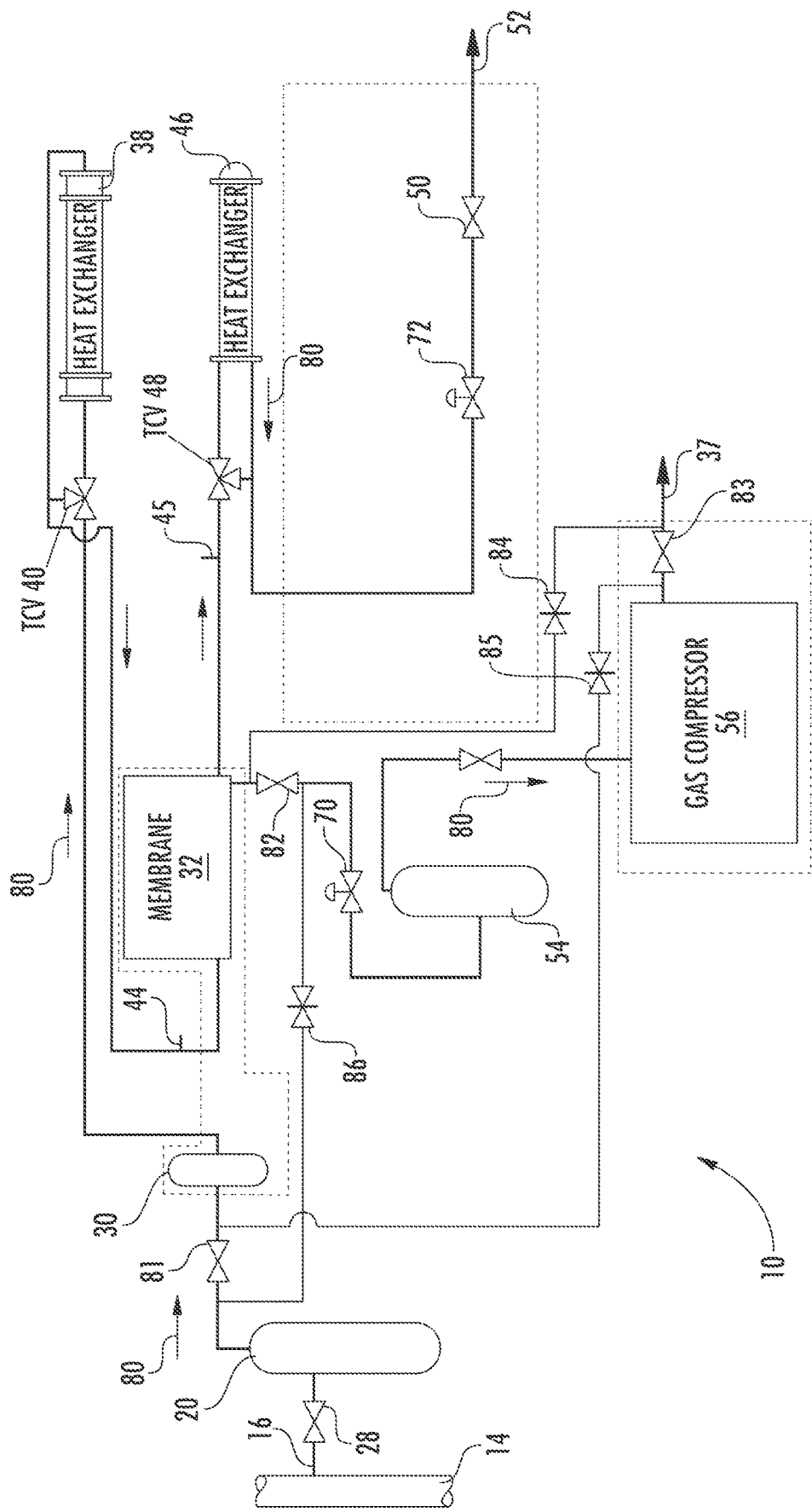
FIG. 5 is a simplified view of the piping and instrumentation diagram of FIG. 4, and showing the natural gas flow through major components.
Figure 6:
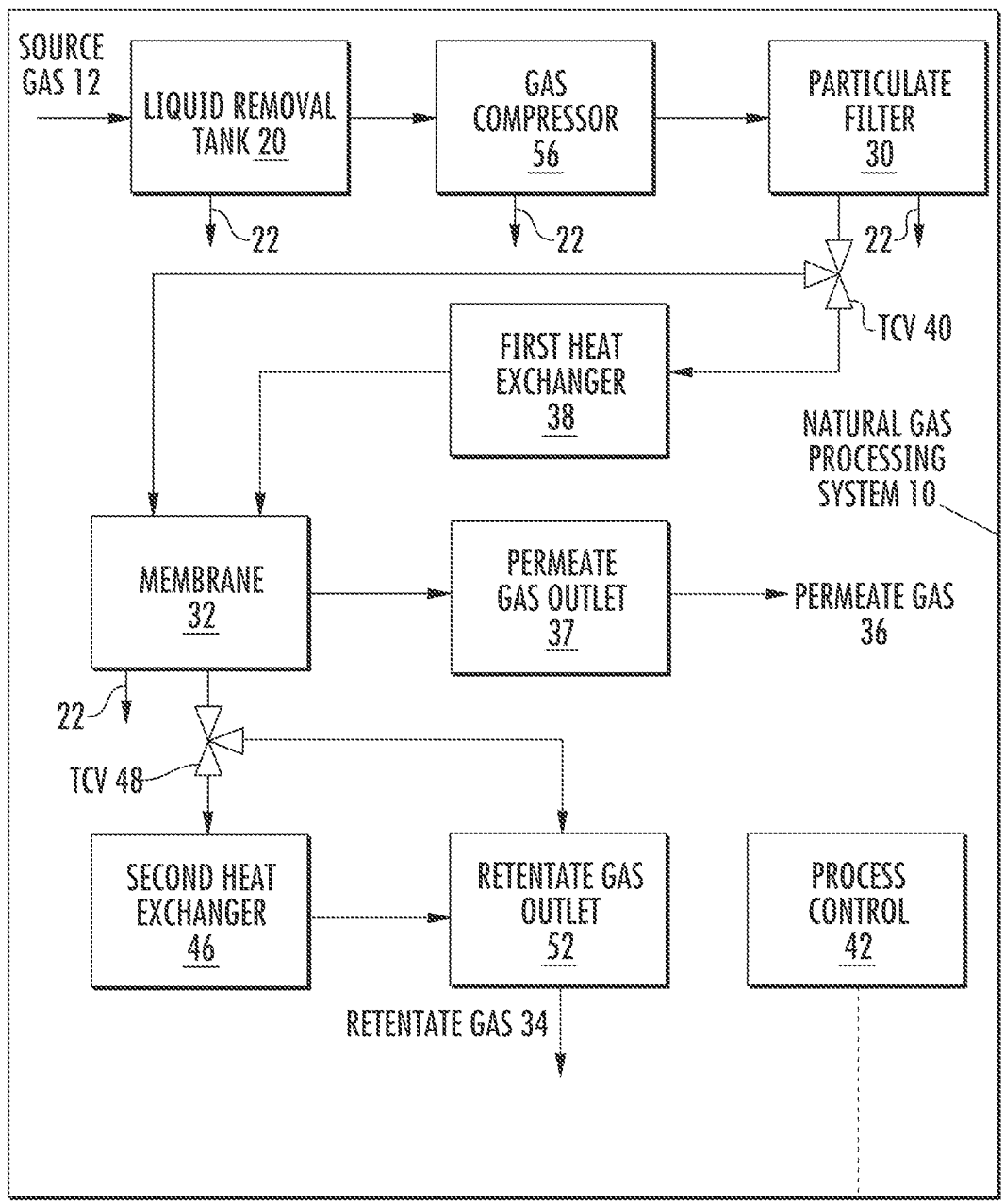
FIG. 6 is a flow diagram of the natural gas processing method and apparatus of FIG. 1, and configured for use with low pressure source natural gas.
Figure 7:
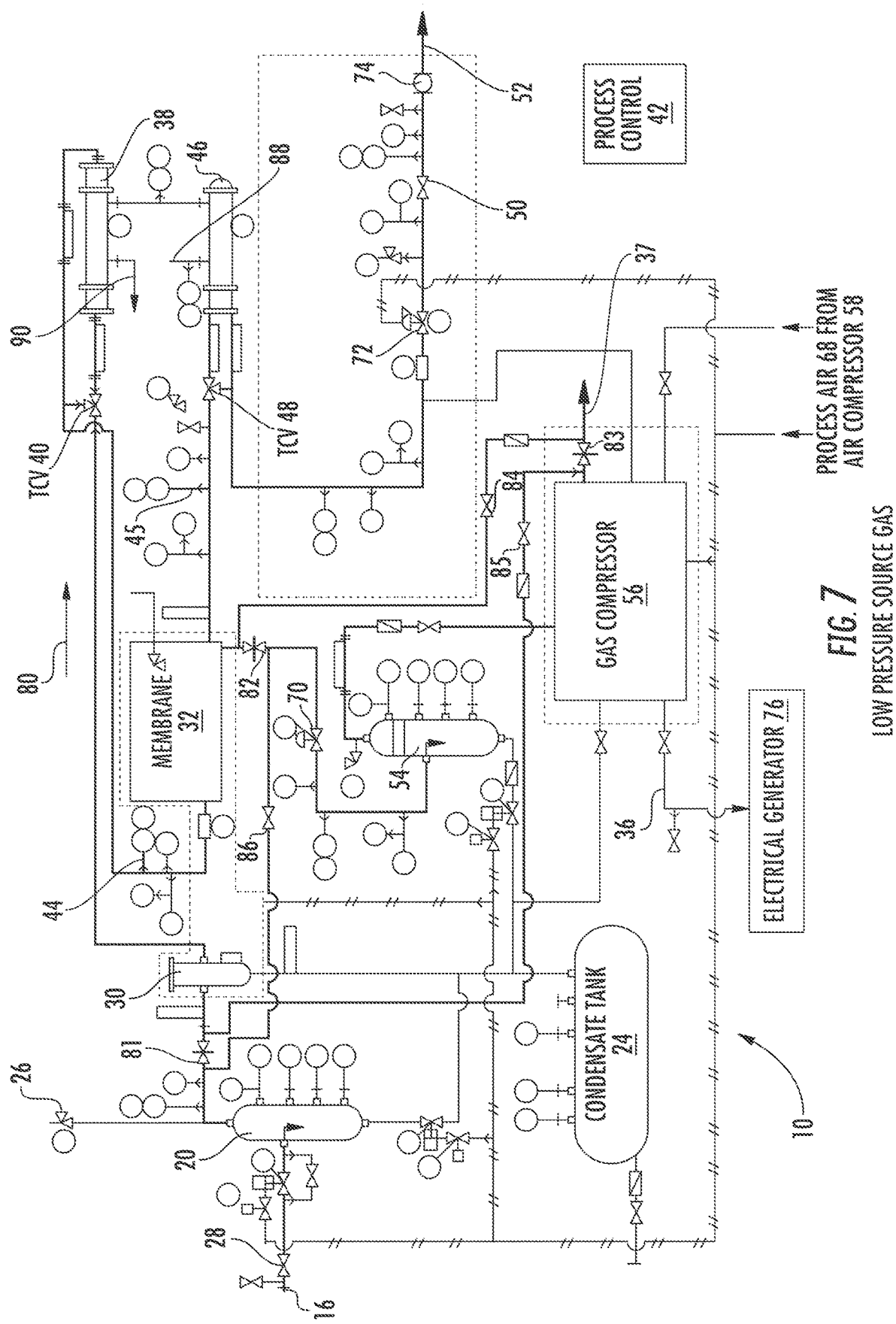
FIG. 7 is a piping and instrumentation diagram of the natural gas processing method and apparatus of FIG. 1, and configured for use with low pressure source natural gas.
Figure 8:
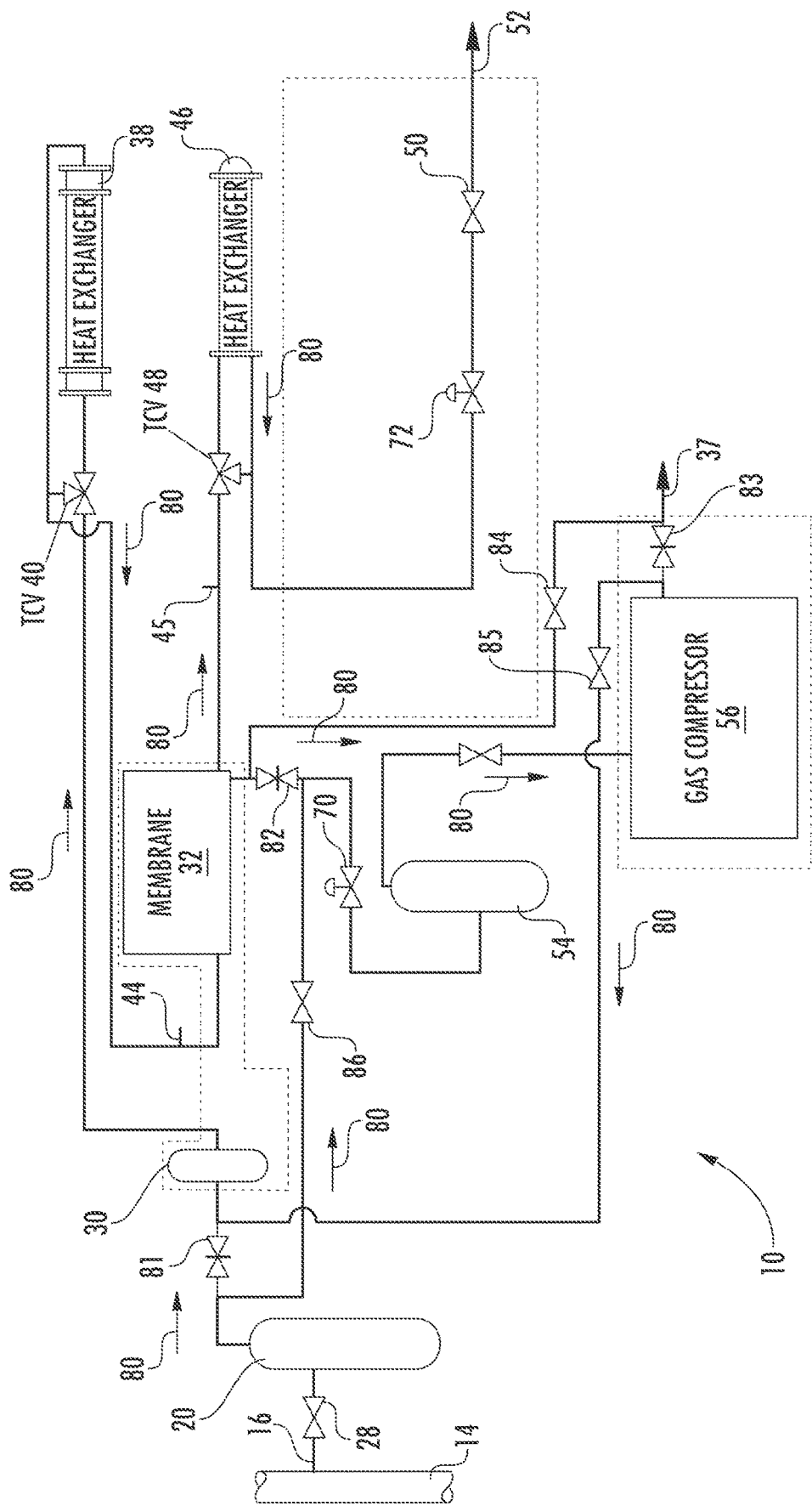
FIG. 8 is a simplified view of the piping and instrumentation diagram of FIG. 7, and showing the natural gas flow through major components.
Figure 9:
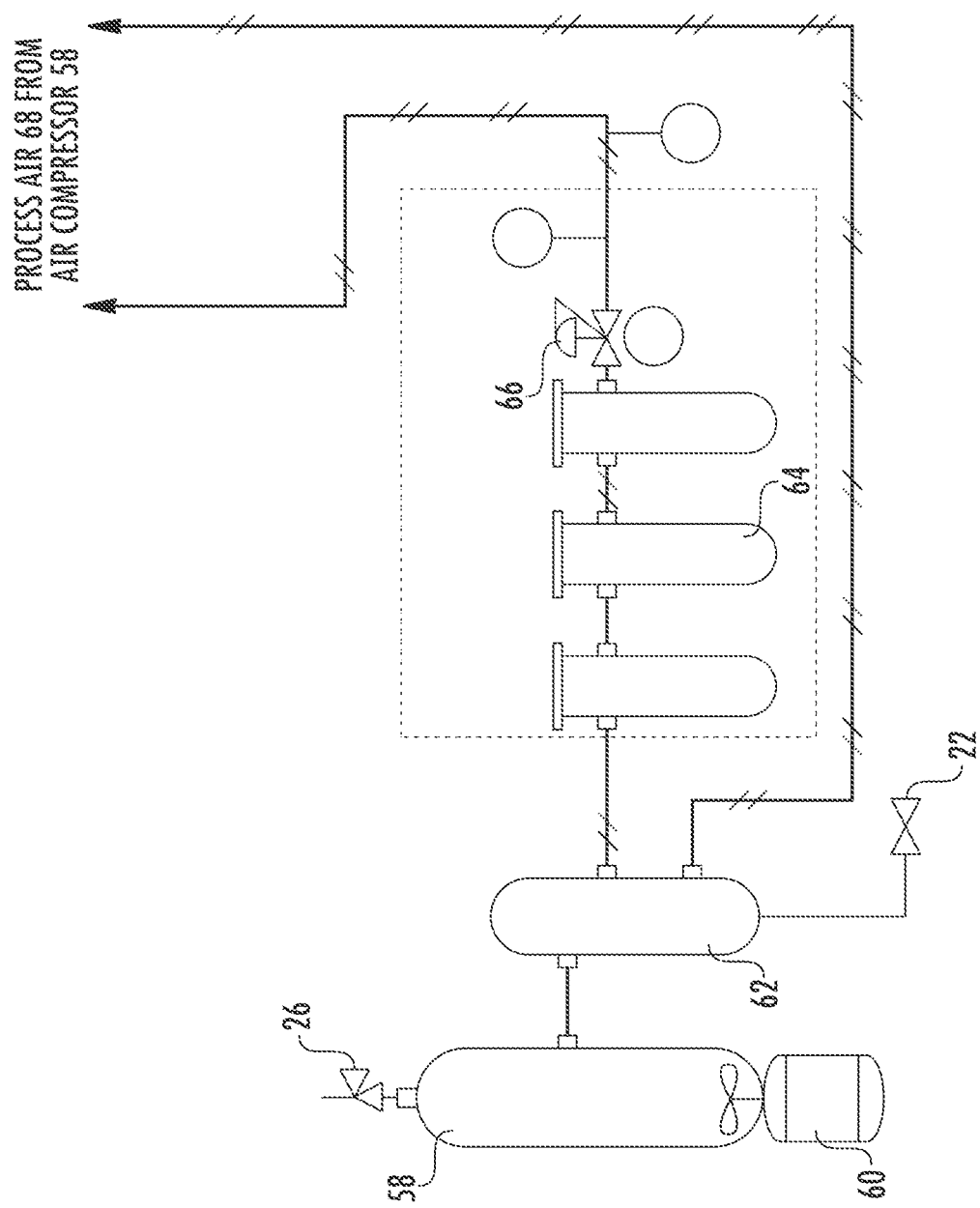
FIG. 9 is a piping and instrumentation diagram of the air compressor used with the natural gas processing method and apparatus of FIG. 1.

This disclosure is one embodiment of the invention that adapts from using high-pressure to using low-pressure source natural gas by adjusting valves. FIGS. 3-5 show the system configured for a high-pressure raw source natural gas 12. FIGS. 6-8 show the system configured for a low-pressure raw source natural gas 12. Referring to the drawing FIGS. 1-9, a natural gas processing system is shown at 10. The system 10 is used in connection with a natural gas source 14 which typically comprises, but is not limited to, a natural gas well or a natural gas pipeline. Raw source natural gas 12 is produced by the source 14. The source natural gas 12 enters the system through natural gas inlet 16.

Figure 1:
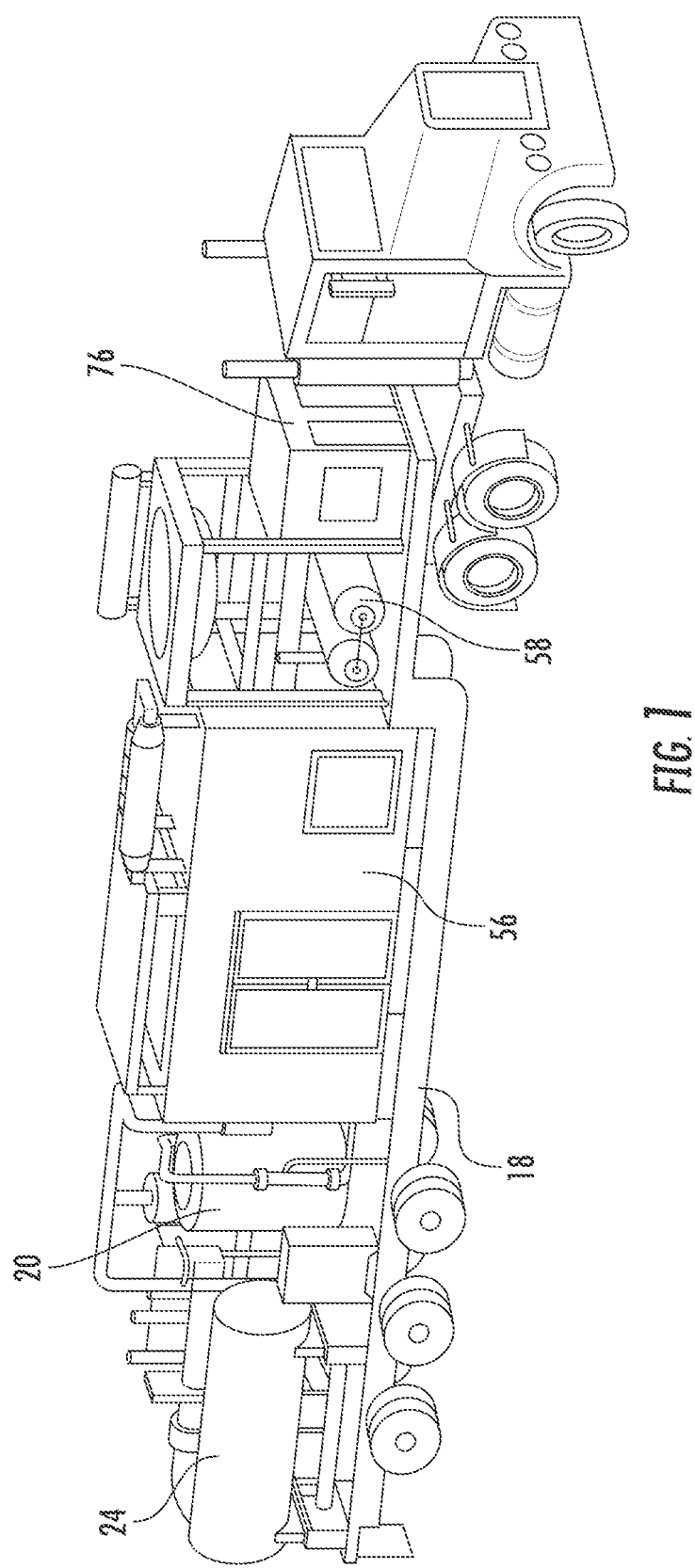
FIG. 1 is a right side perspective view of a natural gas processing method and apparatus constructed in accordance with the invention.

The natural gas processing method and apparatus 10 comprises providing at least one mobile platform 18, and adapting the mobile platform 18 for being transported to the natural gas source 14. The mobile platform 18 is typically a trailer or a skid, but is not limited to these structures. The mobile platform 18 can be any structure capable of receiving and mounting equipment and of being transported to the site of the natural gas source 14. The mobile platform 18 is transported to the natural gas source 14. FIGS. 1 and 2 show a trailer mobile platform 18. It is to be understood that, alternatively, more than one mobile platform 18 can be provided. Several mobile platforms 18 can be provided (not shown). Each mobile platform 18 is capable of receiving and mounting different pieces of equipment and of being transported to the site of the natural gas source 14. At the site, the several mobile platforms 18 are connected together to form the natural gas processing system 10.

A liquid removal tank 20 is juxtaposed with the mobile platform 18. The liquid removal tank 20 is typically mounted on the mobile platform 18, but can be mounted on a separate skid alongside the mobile platform 18. The liquid removal tank 20 is connected in fluid communication to the natural gas source 14, and receives the source natural gas 12. The liquid removal tank 20 separates liquid contaminants such as water from the source natural gas 12. The liquid removal tank 20 also provides settling out of some solids such as dirt and rust particles. The liquid removal tank 20 allows passage of the natural gas through the tank.

A drain connection 22 with associated piping is attached to the bottom of the liquid removal tank 20. The drain 22 is also found on major components throughout the system. All drains 22 typically connect to a condensate tank 24, which is in turn drained periodically. The by-product condensate, mostly water, can also be pumped back into a liquids line if the customer utilizes one in their operation.

A vent connection 26 with associated piping is attached to the top of the liquid removal tank 20. The vent 26 is also found on major components throughout the system. All vents 26 typically bleed gases to the atmosphere through a relief valve.

A source natural gas valve 28 is connected in fluid communication with the natural gas source 14 and the liquid removal tank 20. The source natural gas valve 28 controls the source natural gas 12 entering the natural gas processing system 10.

A particulate filter 30 is juxtaposed with the mobile platform 18, and preferably is mounted on the mobile platform 18. The particulate filter 30 is connected in fluid communication with the liquid removal tank 20. The particulate filter 30 removes particulate matter from the natural gas. The particulate filter 30 also removes some of the water vapor. The particulate filter 30 allows passage of the natural gas through the particulate filter 30.

A membrane 32 is juxtaposed with the mobile platform 18, and preferably is mounted on the mobile platform 18. The membrane 32 is connected in fluid communication with the natural gas source 14. The membrane 32 separates the natural gas into a retentate gas 34 and a permeate gas 36. The membrane 32 allows passage of the permeate gas 36 through the membrane 32. The membrane 32 restricts passage of the retentate gas 34 through the membrane 32.

A retentate valve 50 is connected in fluid communication with the membrane 32. The retentate valve 50 controls the retentate gas 34 exiting the natural gas processing system 10. A retentate gas outlet 52 allows the retentate gas 34 to exit the natural gas processing system 10.

A process control 42 is provided which controls the natural gas processing 10. The process control 42 includes a central processor, a memory, and input and output connections. Input signals are received from instruments throughout the system. Input signals comprise temperature, pressure, and flow at various critical points of the system. Input signals further comprise electrical voltage and current. Output signals are sent to pressure control valves, temperature control valves, and emergency shutdown systems. Shutdown can be initiated from the mobile platform 18 or from an outside source. Control Logic is programmed to monitor the entire process and is able to provide operator ease of use and real time process status updates.

A first heat exchanger 38 is juxtaposed with the mobile platform 18, and preferably is mounted on the mobile platform 18. The first heat exchanger 38 is connected in fluid communication with the membrane 32, and is upstream of the membrane 32. The first heat exchanger 38 changes the temperature of the natural gas entering the membrane 32. Typically, the first heat exchanger 38 will increase the temperature of the natural gas.

A first temperature control valve 40 is connected in fluid communication with the first heat exchanger 38 and the membrane 32. The first temperature control valve 40 is upstream of the first heat exchanger 38 and the membrane 32. The first temperature control valve 40 controls the temperature of the natural gas entering the membrane 32. The first temperature control valve 40 is operatively connected to the process control 42.

The first temperature control valve 40 proportionately divides the flow of the natural gas between the first heat exchanger 38 and the membrane 32 in proportion to the temperature of the natural gas entering the first temperature control valve 40. A first temperature sensor 44 upstream of the membrane 32 determines the temperature of the natural gas at that point. The sensor signal is sent to the process control 42, which in turn adjusts the first temperature control valve 40 to divert more flow or less flow to the first heat exchanger 38. The balance of the flow bypasses the first heat exchanger 38. In this manner, the temperature of the natural gas entering the membrane 32 is thereby controlled within the limits of 80 F-140 F. Preferably, the natural gas enters the membrane at 120 F, which is the optimal pre-membrane temperature for system efficiency. The temperature of the natural gas entering the membrane 32 is thus controlled by proportionately dividing the flow of the natural gas with the first temperature control valve 40.

The particulate filter 30 is connected upstream of the first temperature control valve 40. The particulate filter 30 can be located anywhere upstream of the membrane 32, as it protects the membrane from contaminants.

A second heat exchanger 46 is juxtaposed with the mobile platform 18, and preferably is mounted on the mobile platform 18. The second heat exchanger 46 is connected in fluid communication with the membrane 32 and is downstream of the membrane 32. The second heat exchanger 46 changes the temperature of the natural gas downstream of the membrane 32. Typically, the second heat exchanger 46 will increase the temperature of the natural gas, which is retentate gas 34 exiting the system at the retentate gas outlet 52.

Hot coolant from the gas compressor engine 56 enters the second heat exchanger 46 at the fluid entry 88. Fluid then travels to the first heat exchanger 38. Fluid leaves by fluid exit 90 to be cooled by water cooler 78 and returns to the gas compressor engine 56.

Retentate gas 34 flows downstream toward the second heat exchanger 46. A second temperature control valve 48 is connected downstream of the membrane 32, and in fluid communication with the membrane 32 and the second heat exchanger 46. The second temperature control valve 48 is upstream of the second heat exchanger 46. The second temperature control valve 48 controls the temperature of the natural gas downstream of the membrane 32. Thus, the second temperature control valve 48 controls the temperature of the retentate gas 34 exiting the natural gas processing system 10. The second temperature control valve 48 is operatively connected to the process control 42.

The second temperature control valve 48 proportionately divides the flow of the natural gas between the second heat exchanger 46 and the retentate valve 50 in proportion to the temperature of the natural gas entering the second temperature control valve 48. A second temperature sensor 45 upstream of the retentate gas outlet 52 determines the temperature of the natural gas at that point. The sensor signal is sent to the process control 42, which in turn adjusts the second temperature control valve 48 to divert more flow or less flow to the second heat exchanger 46. The balance of the flow bypasses the second heat exchanger 46. The temperature of the natural gas downstream of the membrane 32 is thus controlled by proportionately dividing the flow of the natural gas with the second temperature control valve 48. In this manner, the temperature of the retentate gas 34 exiting the retentate gas outlet 52 is thereby controlled.

The temperature of retentate gas 34 exiting the natural gas processing system 10 will depend upon how the customers operations and manifold piping system is set up as well as ambient temperature. The retentate gas 34 is used to power auxiliary equipment such as the gas compressor 56. The engine driving the gas compressor requires fuel gas at approximately 70-90 F. Thus, the temperature of retentate gas 34 typically is adjusted within a range of approximately 50-120 F.

A gas compressor 56 is juxtaposed with the mobile platform 18, and preferably is mounted on the mobile platform 18. The gas compressor 56 is connected in fluid communication with the membrane 32. The gas compressor 56 compresses the natural gas. The gas compressor 56 allows passage of the natural gas through the gas compressor 56. The gas compressor is powered by a first power source. The first power source can be a variety of fuels, for example: natural gas; permeate gas; diesel fuel; gasoline; or electricity. Typically, the gas compressor 56 is powered by the natural gas. More particularly, the gas compressor 56 is driven by an engine or turbine (not shown), which is powered by the natural gas. Typically, the gas compressor will require an engine of approximately 600 hp. The gas compressor and engine or turbine combination 56 is well known by those skilled in the art. The gas compressor 56 is adapted for selective connections upstream of the membrane 32 and downstream of the membrane 32. The gas compressor engine 56 is cooled by water cooler 78.

A novel feature of the present invention allows the natural gas processing system 10 to adapt to either low pressure or high pressure source natural gas 12. The gas compressor 56 can be selectively connected upstream of the membrane 32 and closed to flow downstream of the membrane 32 in the case of low pressure source natural gas 12. Alternatively, the gas compressor 56 can be selectively connected downstream of the membrane 32 and closed to flow upstream of the membrane 32 in the case of high pressure source natural gas 12.

Low pressure source natural gas 12 enters the system at below a critical predetermined pressure. Low pressure source natural gas 12 must be boosted in pressure early in the process in order to maintain a pressure drop across the membrane 32 sufficient to separate the permeate gas 36 from the retentate gas 34. To achieve this, process first valve 81, process second valve 82, and process third valve 83, are closed. At the same time, process fourth valve 84, process fifth valve 85, and process sixth valve 86, are open. This selectively connected valve arrangement routes the natural gas through the gas compressor 56 before entering the membrane 32. The valve arrangement is controlled by the process control 42.

High pressure source natural gas 12 enters the system at above the critical predetermined pressure. High pressure source natural gas 12 is able to maintain a pressure drop across the membrane 32 sufficient to separate the permeate gas 36 from the retentate gas 34. To achieve this, process valves 81, 82, 83, are open. At the same time, process valves 84, 85, 86, are closed. This selectively connected valve arrangement routes the natural gas through the membrane 32 before entering the gas compressor 56. The permeate gas 36 must be boosted because of pressure drop across the membrane 32. The valve arrangement is controlled by the process control 42.

The predetermined pressure of the source natural gas 12 entering the natural gas processing system 10 is defined as approximately 400 PSIG. This can vary with ambient air temperature and pressure. This can also vary with customer piping arrangement. For example, if the piping exhibits high pressure drop, the predetermined pressure setpoint can be adjusted upward to ensure sufficient pressure entering the system. Those skilled in the art will selectively adjust the predetermined pressure according to conditions at the site. The process control 42 will automatically adjust the valve arrangement according to the predetermined pressure of the source natural gas 12 entering the natural gas processing system 10.

The gas compressor 56 is selectively connected in fluid communication with the membrane 32 in either one of two ways. One possible connection is upstream of the membrane 32 in order to compress the natural gas before entering the membrane 32. This is in the event that a pressure of the source natural gas 12 entering the natural gas processing system 10 is less than the predetermined pressure.

The alternative connection is downstream of the membrane 32 so as to compress the natural gas after exiting the membrane 32. This is in the event that the pressure of the source natural gas 12 entering the natural gas processing system 10 is greater than the predetermined pressure.

A gas compressor scrubber 54 removes contaminants from the natural gas entering the gas compressor 56. This is especially necessary in the case of low pressure source natural gas 12 which enters the gas compressor 56 before the particulate filter 30.

A first pressure control valve 70 is connected in fluid communication with the membrane 32 and the gas compressor 56. The first pressure control valve 70 is upstream of the gas compressor 56 and operatively connected to the process control 42 for controlling a pressure of the natural gas entering the gas compressor 56.

A second pressure control valve 72 is connected in fluid communication with the membrane 32. The second pressure control valve 72 is installed downstream of the membrane 32. The second pressure control valve 72 is operatively connected to the process control 42 for controlling the pressure of the natural gas downstream of the membrane 32. The natural gas downstream of the membrane 32 in this case is the retentate gas 34. The retentate gas 34 flows through a retentate valve 50 and a flow meter 74 and exits the system through the retentate gas outlet 52.

A permeate gas outlet 37 allows the permeate gas 36 to exit the natural gas processing system 10. The permeate gas 36 can be used to fuel engines for auxiliary equipment, as described above. The permeate gas 36 remains in a gaseous form and is injected back into the pipeline from which it was sourced in its raw form. This eliminates the complications of storing gas or liquid permeate onsite or removing via truck. There is no longer any justification for wasteful flaring of gas.

An air compressor 58 is juxtaposed with the mobile platform 18, and preferably is mounted on the mobile platform 18 for supplying process compressed air 68. The air compressor 58 is powered by a second power source. The second power source can be a variety of fuels, for example: natural gas; permeate gas; diesel fuel; gasoline; and electricity. Typically, the air compressor 58 is driven by an air compressor electric motor 60, and is powered by electricity from the electrical generator 76. The air compressor 58 is operatively connected to the electrical generator 76. The air compressor 58 is connected in fluid communication with a compressed air storage tank 62, air filters 64, and air pressure regulator 66.

An electrical generator 76 is juxtaposed with the mobile platform 18. The electrical generator 76 is preferably mounted on the mobile platform 18. However, it can be on a separate skid. The electrical generator 76 supplies process electricity. The electrical generator is powered by a third power source. The third power source can be a variety of fuels, for example: natural gas; permeate gas; diesel fuel; and gasoline. Typically, the electrical generator 76 is powered by the natural gas.

The process control 42 is operatively connected to the source natural gas valve 28, the retentate valve 50, the first temperature control valve 40, the second temperature control valve 48, the first pressure control valve 70, the second pressure control valve 72, the gas compressor, the electrical generator 76, and the air compressor 58. The process control 42 is operatively connected to all the controllable valves and instruments. The process control 42 controls the natural gas processing 10. The selective connections are controlled by the process control 42.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

PARTS LIST

Natural Gas Apparatus and Method for In-Situ Processing

| PART NO. | DESCRIPTION |
| --- | --- |
| 10 | natural gas processing system |
| 12 | raw source natural gas |
| 14 | natural gas source |
| 16 | natural gas inlet |
| 18 | mobile platform |
| 20 | liquid removal tank |
| 22 | drain |
| 24 | condensate tank |
| 26 | vent |
| 28 | source natural gas valve |
| 30 | particulate filter |
| 32 | membrane |
| 34 | retentate gas |
| 36 | permeate gas |
| 37 | permeate gas outlet |
| 38 | first heat exchanger |
| 40 | first temperature control valve |
| 42 | process control |
| 44 | first temperature sensor |
| 45 | second temperature sensor |
| 46 | second heat exchanger |
| 48 | second temperature control valve |
| 50 | retentate valve |
| 52 | retentate gas outlet |
| 54 | gas compressor scrubber |
| 56 | gas compressor |
| 58 | air compressor |
| 60 | air compressor electric motor |
| 62 | compressed air storage tank |
| 64 | air filters |
| 66 | air pressure regulator |
| 68 | process compressed air |
| 70 | first pressure control valve |
| 72 | second pressure control valve |
| 74 | flow meter |
| 76 | electrical generator |
| 78 | water cooler |
| 80 | process direction |
| 81 | process first valve |
| 82 | process second valve |
| 83 | process third valve |
| 84 | process fourth valve |
| 85 | process fifth valve |
| 86 | process sixth valve |
| 88 | fluid entry |
| 90 | fluid exit |

What is claimed is:

1. A method for natural gas processing with a natural gas processing system, for use in connection with a natural gas source and raw source natural gas produced by the source, the method comprising:

providing at least one mobile platform, and adapting the mobile platform for being transported to the natural gas source;

transporting the mobile platform to the natural gas source;

juxtaposing a liquid removal tank with the mobile platform;

connecting the liquid removal tank in fluid communication to the natural gas source and receiving the source natural gas into the liquid removal tank;

separating liquid contaminants from the source natural gas with the liquid removal tank and allowing passage of the natural gas through the liquid removal tank;

connecting a source natural gas valve in fluid communication with the natural gas source and the liquid removal tank and controlling the source natural gas entering the natural gas processing system with the source natural gas valve;

juxtaposing a particulate filter with the mobile platform and connecting the particulate filter in fluid communication with the liquid removal tank;

removing particulate matter from the natural gas with the particulate filter and allowing passage of the natural gas through the particulate filter;

juxtaposing a membrane with the mobile platform and connecting the membrane in fluid communication with the natural gas source;

separating the natural gas into a retentate gas and a permeate gas with the membrane;
allowing passage of the permeate gas through the membrane;
restricting passage of the retentate gas through the membrane;
connecting a retentate valve in fluid communication with the membrane and controlling the retentate gas exiting the natural gas processing system with the retentate valve;
juxtaposing a gas compressor with the mobile platform, connecting the gas compressor in fluid communication with the membrane, and powering the gas compressor by a first power source;
compressing the natural gas with the gas compressor and allowing passage of the natural gas through the gas compressor;
juxtaposing an air compressor with the mobile platform, supplying process compressed air with the air compressor, and powering the air compressor by a second power source;
juxtaposing an electrical generator with the mobile platform, supplying process electricity with the electrical generator, and powering the electrical generator by a third power source; and
connecting a process control operatively to at least the gas compressor, the electrical generator, and the air compressor, and controlling the natural gas processing system with the process control.

2. The method of claim 1, further comprising:
selectively connecting the gas compressor in fluid communication with the membrane in a one of upstream of the membrane and downstream of the membrane; and
controlling the selectively connecting the gas compressor with the process control.

3. The method of claim 2, wherein a pressure of the source natural gas entering the natural gas processing system is less than a predetermined pressure, the method further comprising:
selectively connecting the gas compressor upstream of the membrane; and
compressing the natural gas before entering the membrane.

4. The method of claim 2, wherein a pressure of the source natural gas entering the natural gas processing system is greater than a predetermined pressure, the method further comprising:
selectively connecting the gas compressor downstream of the membrane; and
compressing the natural gas after exiting the membrane.

5. The method of claim 1, further comprising:
connecting a first pressure control valve in fluid communication with the membrane and the gas compressor;
connecting the first pressure control valve upstream of the gas compressor;
operatively connecting the first pressure control valve to the process control; and
controlling a pressure of the natural gas entering the gas compressor with the first pressure control valve.

6. The method of claim 1, further comprising:
connecting a second pressure control valve in fluid communication with the membrane;
connecting the second pressure control valve downstream of the membrane;
operatively connecting the second pressure control valve to the process control; and
controlling a pressure of the natural gas downstream of the membrane with the second pressure control valve.

7. The method of claim 1, further comprising:
juxtaposing a first heat exchanger with the mobile platform and connecting the first heat exchanger upstream of the membrane in fluid communication with the membrane;
changing a temperature of the natural gas entering the membrane with the first heat exchanger;
connecting a first temperature control valve upstream of the membrane in fluid communication with the membrane and the first heat exchanger; and
operatively connecting the first temperature control valve to the process control for controlling the temperature of the natural gas entering the membrane.

8. The method of claim 7, further comprising:
proportionately dividing the flow of the natural gas between the first heat exchanger and the membrane in proportion to the temperature of the natural gas entering the first temperature control valve; and
controlling the temperature of the natural gas entering the membrane by the proportionately dividing the flow of the natural gas with the first temperature control valve.

9. The method of claim 1, further comprising:
juxtaposing a second heat exchanger with the mobile platform and connecting the second heat exchanger downstream of the membrane in fluid communication with the membrane;
changing a temperature of the natural gas downstream of the membrane with the second heat exchanger;
connecting a second temperature control valve downstream of the membrane in fluid communication with the membrane and the second heat exchanger; and
operatively connecting the second temperature control valve to the process control for controlling the temperature of the natural gas downstream of the membrane.

10. The method of claim 9, further comprising:
proportionately dividing the flow of the natural gas between the second heat exchanger and the retentate valve in proportion to the temperature of the natural gas entering the second temperature control valve; and
controlling the temperature of the natural gas downstream of the membrane by the proportionately dividing the flow of the natural gas with the second temperature control valve.

11. The method of claim 1, further comprising:
processing the source natural gas having the properties of:
a pressure range of from 50 psig to 1200 psig;
a temperature range of from 40° F. to 120° F.; and
a BTU composition range from 1,100 BTU to 1,400 BTU; and wherein
the source natural gas saturation levels are at dewpoint.

12. The method of claim 1, further comprising:
processing the source natural gas having the properties of:
a pressure range of from atmospheric pressure to 2400 psig;
a temperature range of from 30° F. to 180° F.; and
a BTU composition range from 950 BTU to 1800 BTU; and wherein
the source natural gas saturation levels are at dewpoint.

13. The method of claim 1, further comprising selecting the first power source from the group consisting of: natural gas; permeate gas; diesel fuel; gasoline; and electricity.

14. The method of claim 1, further comprising selecting the second power source from the group consisting of: natural gas; permeate gas; diesel fuel; gasoline; and electricity.

15. The method of claim 1, further comprising selecting the third power source from the group consisting of: natural gas; permeate gas; diesel fuel; and gasoline.

16. The method of claim 1, further comprising:
juxtaposing a condensate tank with the mobile platform; and
connecting the condensate tank in fluid communication with the liquid removal tank, the particulate filter, the membrane, and the gas compressor, for collecting water and contaminants.

17. A method for natural gas processing with a natural gas processing system, for use in connection with a natural gas source and raw source natural gas produced by the source, the method comprising:
providing at least one mobile platform, and adapting the mobile platform for being transported to the natural gas source;
transporting the mobile platform to the natural gas source;
juxtaposing a liquid removal tank with the mobile platform;
connecting the liquid removal tank in fluid communication to the natural gas source and receiving the source natural gas into the liquid removal tank;
separating liquid contaminants from the source natural gas with the liquid removal tank and allowing passage of the natural gas through the liquid removal tank;
connecting a source natural gas valve in fluid communication with the natural gas source and the liquid removal tank, and controlling the source natural gas entering the liquid removal tank with the source natural gas valve;
mounting a particulate filter on the mobile platform and connecting the particulate filter in fluid communication with the liquid removal tank;
removing particulate matter from the natural gas with the particulate filter and allowing passage of the natural gas through the particulate filter;
mounting a membrane on the mobile platform and connecting the membrane in fluid communication with the natural gas source;
separating the natural gas into a retentate gas and a permeate gas with the membrane;
allowing passage of the permeate gas through the membrane;
restricting passage of the retentate gas through the membrane;
connecting a retentate valve in fluid communication with the membrane and controlling the retentate gas exiting the natural gas processing system with the retentate valve;
mounting a gas compressor on the mobile platform, compressing the natural gas with the gas compressor, allowing passage of the natural gas through the gas compressor, and powering the gas compressor by a first power source;
selectively connecting the gas compressor upstream of the membrane and downstream of the membrane, wherein the gas compressor is selectively connected in fluid communication with the membrane in a one of:
upstream of the membrane so as to compress the natural gas before entering the membrane, wherein a pressure of the source natural gas entering the natural gas processing system is less than a predetermined pressure; and
downstream of the membrane so as to compress the natural gas after exiting the membrane, wherein the pressure of the source natural gas entering the natural gas processing system is greater than the predetermined pressure;
juxtaposing an air compressor with the mobile platform, supplying process compressed air with the air compressor, and powering the air compressor by a second power source;
juxtaposing an electrical generator with the mobile platform, supplying process electricity with the electrical generator, and powering the electrical generator by a third power source; and
connecting a process control operatively to at least the source natural gas valve, the retentate valve, the gas compressor, the electrical generator, and the air compressor, and controlling the natural gas processing system with the process control.

18. The method of claim 17, further comprising:
mounting a first heat exchanger on the mobile platform and connecting the first heat exchanger upstream of the membrane in fluid communication with the membrane;
changing a temperature of the natural gas entering the membrane with the first heat exchanger;
connecting a first temperature control valve upstream of the membrane in fluid communication with the membrane and the first heat exchanger; and
operatively connecting the first temperature control valve to the process control for controlling the temperature of the natural gas entering the membrane.

19. The method of claim 18, further comprising:
proportionately dividing the flow of the natural gas between the first heat exchanger and the membrane in proportion to the temperature of the natural gas entering the first temperature control valve; and
controlling the temperature of the natural gas entering the membrane by the proportionately dividing the flow of the natural gas with the first temperature control valve.

20. The method of claim 17, further comprising:
mounting a second heat exchanger on the mobile platform and connecting the second heat exchanger downstream of the membrane in fluid communication with the membrane;
changing a temperature of the natural gas downstream of the membrane with the second heat exchanger;
connecting a second temperature control valve downstream of the membrane in fluid communication with the membrane and the second heat exchanger; and
operatively connecting the second temperature control valve to the process control for controlling the temperature of the natural gas downstream of the membrane.

21. The method of claim 20, further comprising:
proportionately dividing the flow of the natural gas between the second heat exchanger and the retentate valve in proportion to the temperature of the natural gas entering the second temperature control valve; and
controlling the temperature of the natural gas downstream of the membrane by the proportionately dividing the flow of the natural gas with the second temperature control valve.

22. The method of claim 17, further comprising:
connecting a first pressure control valve in fluid communication with the membrane and the gas compressor;

connecting the first pressure control valve upstream of the gas compressor;

operatively connecting the first pressure control valve to the process control; and controlling a pressure of the natural gas entering the gas compressor with the first pressure control valve.

23. The method of claim 17, further comprising:

connecting a second pressure control valve in fluid communication with the membrane;

connecting the second pressure control valve downstream of the membrane;

operatively connecting the second pressure control valve to the process control; and controlling a pressure of the natural gas downstream of the membrane with the second pressure control valve.

24. The method of claim 17, further comprising:

processing the source natural gas having the properties of:

a pressure range of from 50 psig to 1200 psig;

a temperature range of from 40° F. to 120° F.; and a BTU composition range from 1,100 BTU to 1,400 BTU; and wherein the source natural gas saturation levels are at dewpoint.

25. The method of claim 17, further comprising:

processing the source natural gas having the properties of:

a pressure range of from atmospheric pressure to 2400 psig;

a temperature range of from 30° F. to 180° F.; and a BTU composition range from 950 BTU to 1800 BTU; and wherein the source natural gas saturation levels are at dewpoint.

26. The method of claim 17, further comprising selecting the first power source from the group consisting of: natural gas; permeate gas; diesel fuel; gasoline; and electricity.

27. The method of claim 17, further comprising selecting the second power source from the group consisting of: natural gas; permeate gas; diesel fuel; gasoline; and electricity.

28. The method of claim 17, further comprising selecting the third power source from the group consisting of: natural gas; permeate gas; diesel fuel; and gasoline.

29. The method of claim 17, further comprising:

juxtaposing a condensate tank with the mobile platform; and connecting the condensate tank in fluid communication with the liquid removal tank, the particulate filter, the membrane, and the gas compressor, for collecting water and contaminants.

30. A method for natural gas processing with a natural gas processing system, for use in connection with a natural gas source and raw source natural gas produced by the source, the method comprising:

providing at least one mobile platform, and adapting the mobile platform for being transported to the natural gas source;

transporting the mobile platform to the natural gas source;

juxtaposing a liquid removal tank with the mobile platform;

connecting the liquid removal tank in fluid communication to the natural gas source and receiving the source natural gas into the liquid removal tank;

separating liquid contaminants from the source natural gas with the liquid removal tank and allowing passage of the natural gas through the liquid removal tank;

connecting a source natural gas valve in fluid communication with the natural gas source and the liquid removal tank and controlling the source natural gas entering the liquid removal tank with the source natural gas valve;

mounting a particulate filter on the mobile platform and connecting the particulate filter in fluid communication with the liquid removal tank;

removing particulate matter from the natural gas with the particulate filter and allowing passage of the natural gas through the particulate filter;

mounting a membrane on the mobile platform and connecting the membrane in fluid communication with the natural gas source;

separating the natural gas into a retentate gas and a permeate gas with the membrane;

allowing passage of the permeate gas through the membrane;

restricting passage of the retentate gas through the membrane;

connecting a retentate valve in fluid communication with the membrane and controlling the retentate gas exiting the natural gas processing system with the retentate valve;

mounting a gas compressor on the mobile platform, compressing the natural gas with the gas compressor, allowing passage of the natural gas through the gas compressor;

selectively connecting the gas compressor upstream of the membrane and downstream of the membrane, wherein the gas compressor is selectively connected in fluid communication with the membrane in a one of:

upstream of the membrane so as to compress the natural gas before entering the membrane, wherein a pressure of the source natural gas entering the natural gas processing system is less than a predetermined pressure; and downstream of the membrane so as to compress the natural gas after exiting the membrane, wherein the pressure of the source natural gas entering the natural gas processing system is greater than the predetermined pressure;

providing a process control for controlling the natural gas processing system;

mounting a first heat exchanger on the mobile platform and connecting the first heat exchanger upstream of the membrane in fluid communication with the membrane;

changing a temperature of the natural gas entering the membrane with the first heat exchanger;

connecting a first temperature control valve upstream of the membrane in fluid communication with the membrane and the first heat exchanger;

operatively connecting the first temperature control valve to the process control for controlling the temperature of the natural gas entering the membrane;

proportionately dividing the flow of the natural gas between the first heat exchanger and the membrane in proportion to the temperature of the natural gas entering the first temperature control valve;

controlling the temperature of the natural gas entering the membrane by the proportionately dividing the flow of the natural gas with the first temperature control valve;

mounting a second heat exchanger on the mobile platform and connecting the second heat exchanger downstream of the membrane in fluid communication with the membrane;

changing a temperature of the natural gas downstream of the membrane with the second heat exchanger;

connecting a second temperature control valve downstream of the membrane in fluid communication with the membrane and the second heat exchanger;

operatively connecting the second temperature control valve to the process control for controlling the temperature of the natural gas downstream of the membrane;

proportionately dividing the flow of the natural gas between the second heat exchanger and the retentate valve in proportion to the temperature of the natural gas entering the second temperature control valve;

controlling the temperature of the natural gas downstream of the membrane by the proportionately dividing the flow of the natural gas with the second temperature control valve;

mounting an air compressor on the mobile platform and supplying process compressed air with the air compressor;

mounting an electrical generator on the mobile platform and supplying process electricity with the electrical generator; and connecting the process control operatively to at least the source natural gas valve, the retentate valve, the gas compressor, the electrical generator, and the air compressor.

31. The method of claim 30, further comprising:
connecting a first pressure control valve in fluid communication with the membrane and the gas compressor;
connecting the first pressure control valve upstream of the gas compressor;
operatively connecting the first pressure control valve to the process control; and
controlling a pressure of the natural gas entering the gas compressor with the first pressure control valve.

32. The method of claim 30, further comprising:
connecting a second pressure control valve in fluid communication with the membrane;
connecting the second pressure control valve downstream of the membrane;
operatively connecting the second pressure control valve to the process control; and
controlling a pressure of the natural gas downstream of the membrane with the second pressure control valve.

33. The method of claim 30, further comprising connecting the process control operatively to at least the source natural gas valve, the retentate valve, the gas compressor, the electrical generator, and the air compressor.

34. The method of claim 30, further comprising:
powering the gas compressor with the natural gas;
powering the electrical generator with the natural gas; and
powering the air compressor with electricity from the electrical generator.

* * * * *